Nov. 30, 1954  E. A. PARDEE ET AL  2,695,423
APPARATUS FOR FORMING CONTAINERS
Filed Sept. 25, 1948  3 Sheets-Sheet 2
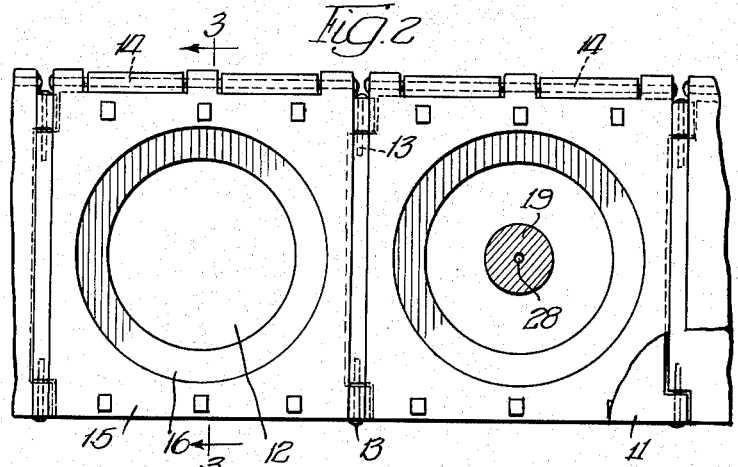
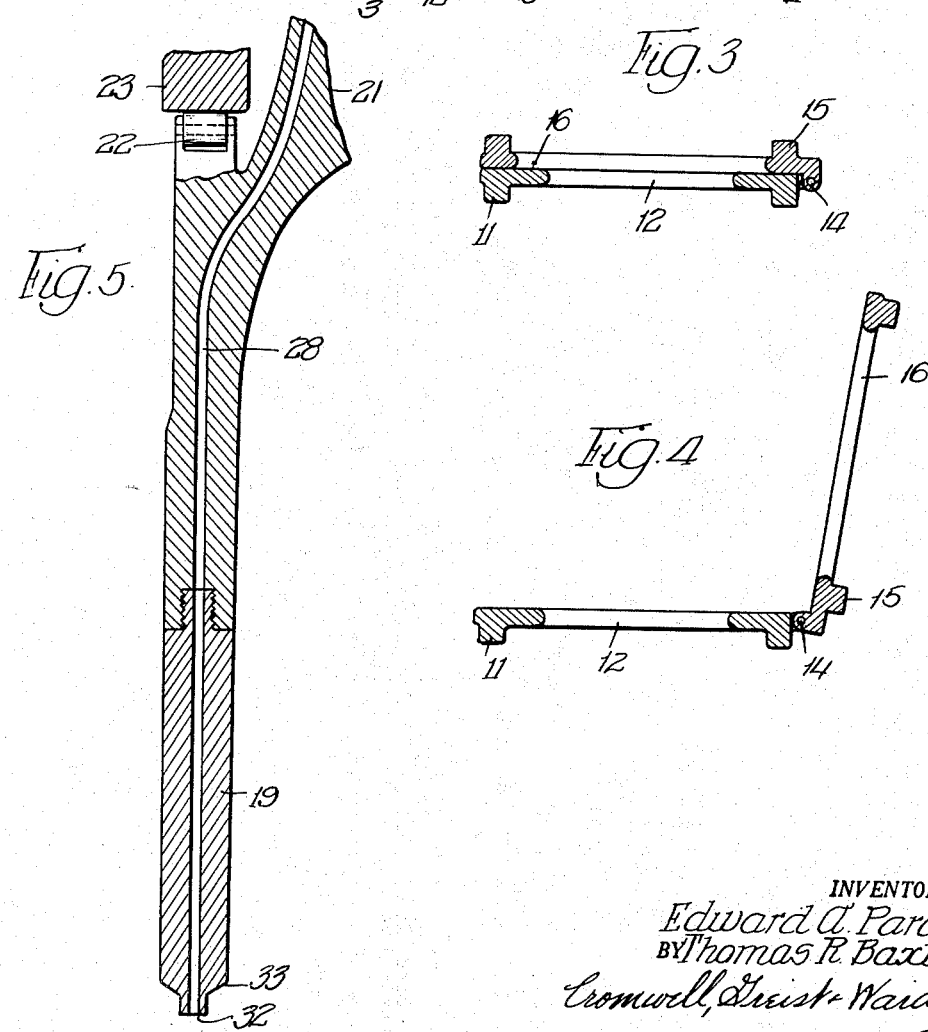
INVENTORS.
Edward A. Pardee,
BY Thomas R. Baxter.

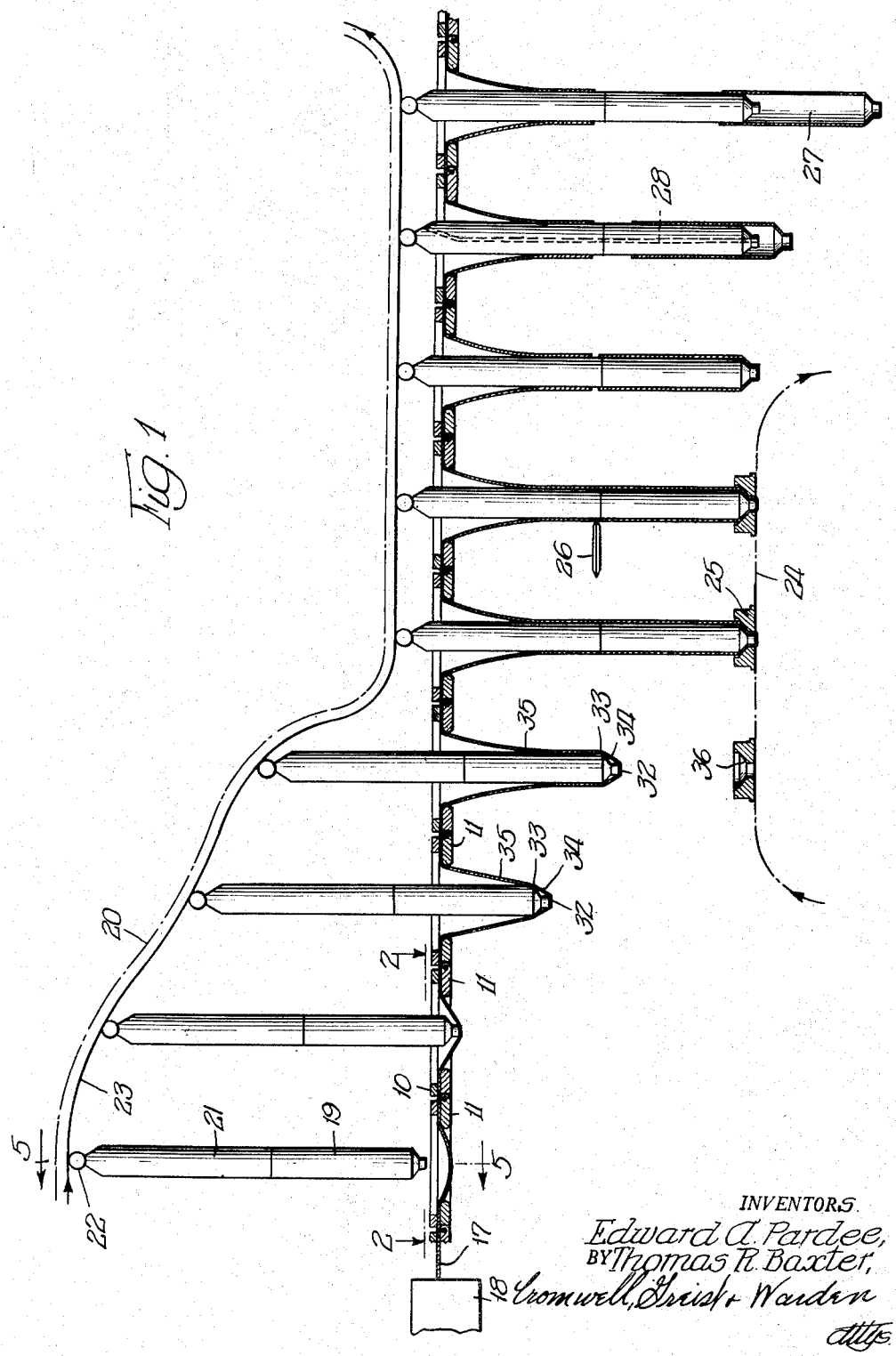

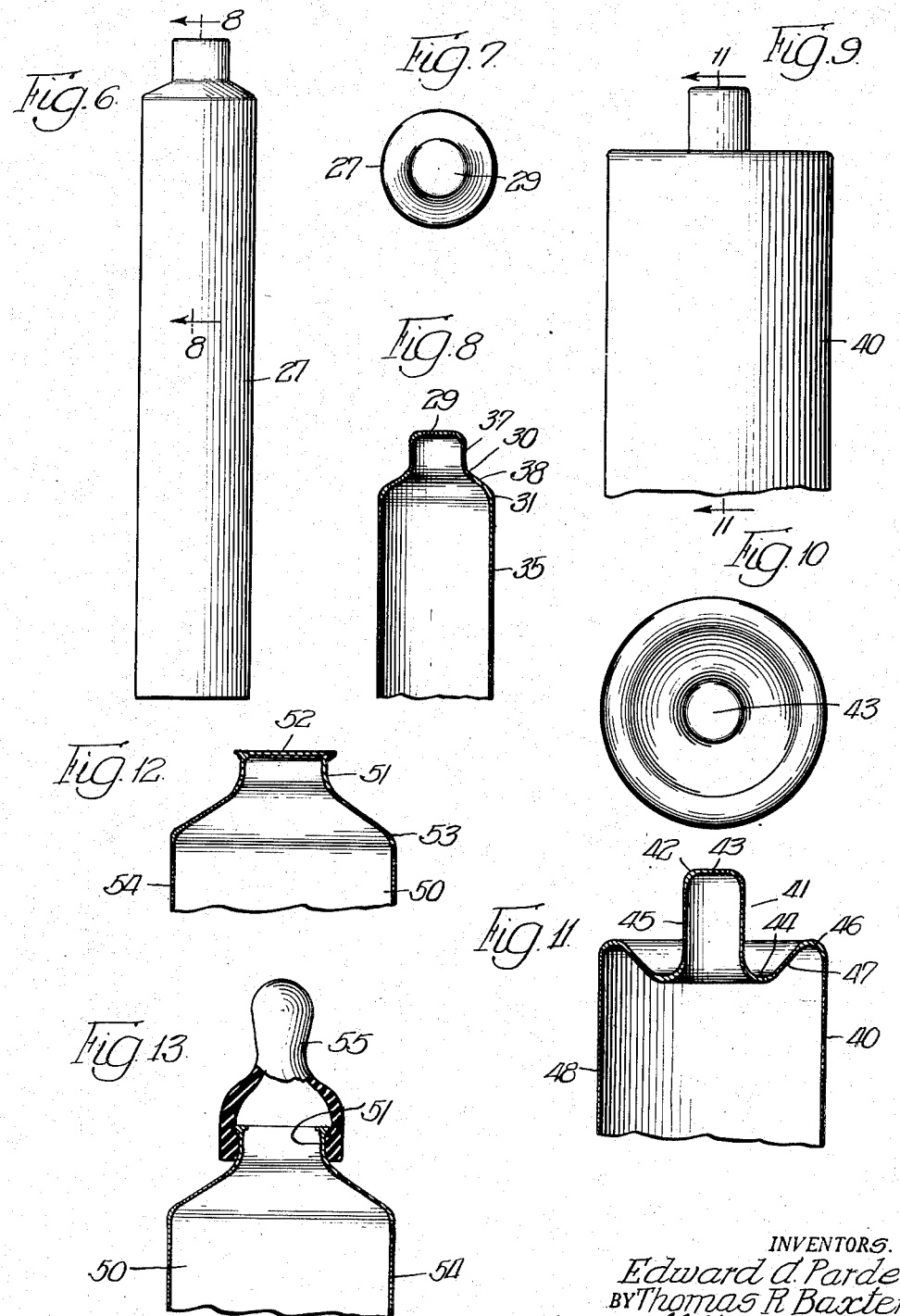

United States Patent Office 2,695,423
Patented Nov. 30, 1954

2,695,423

APPARATUS FOR FORMING CONTAINERS

Edward A. Pardee and Thomas R. Baxter, Mount Vernon, Ohio, assignors, by mesne assignments, to Continental Can Company, Inc., New York, N. Y., a corporation of New York Application September 25, 1948, Serial No. 51,204

3 Claims. (Cl. 18—19)

This invention relates to improvements in apparatus for forming containers by a method which comprises drawing heated plastic film over a male forming member having the desired contour of the container and then bringing a female forming member into contact with the material to cause the material to conform to the shape of the male forming member and to thereby form the container.

It is an object of the invention to provide apparatus for use in a method of forming containers which comprises securing the peripheral edges of plastic sheet material having the drawing characteristics of polyethylene film, heating the sheet material to a predetermined temperature to cause the material to become sufficiently soft for it to be drawn, moving the material relative to a male former member having the desired shape of the container while controlling the drawing of the material at predetermined areas, and finally bringing a female former member into contact with the material to further draw the material between said areas into the final container shape.

It is a more specific object of the invention to provide apparatus for use in a method of forming a container or the like wherein a sheet of polyethylene film or other material having similar drawing characteristics is clamped at its peripheral edges in a circular clamp, the material is heated to a temperature of approximately 250° F. to 275° F. until it becomes sufficiently soft to draw, a male die having the shape of the desired container is moved relative to the clamp to draw the material over the surfaces of the male die in such a manner that the material contacts the die at predetermined spaced points or areas only, and a female die is moved into contact with the male die to further draw the material intermediate the initial points of contact of the material with the male die whereby to shape the material into the final form of the container.

Another object of the invention is to provide apparatus for producing a container which is drawn from a plastic sheet material having the drawing characteristics of polyethylene film in such a manner that predetermined portions of the container walls will be relatively thick and rigid while the intervening portions of the container walls will be substantially thinner and more flexible.

A further object of the invention is to provide apparatus for producing a nursing unit which is formed of a sheet of polyethylene film or polyethylene and a Pliofilm, a Saran or a vinyl film to provide a body portion and an integral top including a nursing nipple portion.

Another object of the invention is to provide apparatus for producing a nursing unit which comprises a one-piece disposable container having an integral top and nipple receiving formation thereon and a separable covering member of dissimilar material which may be readily stripped off to expose the top of the receptacle for the reception of a nipple.

These and other objects of the invention will be apparent from a consideration of the herein described method and the several forms of containers which are shown by way of illustration in the accompanying drawings, wherein:

Fig. 1 is a schematic elevation of apparatus which embodies applicant's invention;

Fig. 2 is a plan view to an enlarged scale of the sheet material clamping members, taken generally on the line 2—2 of Fig. 1;

Fig. 3 is a section on the line 3—3 of Fig. 2 showing the clamping members in the closed position;

Fig. 4 is a section similar to Fig. 3 showing the clamping members in the open position;

Fig. 5 is a sectional elevational view, to an enlarged scale, showing the male former member, the view being taken on the line 5—5 of Fig. 1;

Fig. 6 is an elevation of a tubular container formed in accordance with the applicant's method;

Fig. 7 is a plan view of the container shown in Fig. 6;

Fig. 8 is a section taken on the line 8—8 of Fig. 6;

Fig. 9 is a partial elevation of a nursing unit which has been formed in accordance with applicant's method;

Fig. 10 is a plan view of the nursing unit;

Fig. 11 is a section on the line 11—11 of Fig. 9;

Fig. 12 is a section similar to Fig. 11 but showing a modified form of the nursing unit; and Fig. 13 is a section similar to Fig. 12 but with the top protecting member removed and the nipple in place thereon.

Referring to the drawings in Figs. 1 to 5, there is illustrated somewhat schematically an apparatus which embodies applicant's invention. Only certain parts of the apparatus are illustrated in detail, it being understood that the remainder of the mechanism is adapted to be constructed in a manner which will be evident to those skilled in this art.

An endless conveyor 10 is provided with its upper run traveling in a horizontal path and having a series of hingedly connected bottom clamping elements 11. Each bottom clamping member or element 11 is plate-like in form and provided with a central aperture 12. The members 11 are connected by pins at 13 in linked or hinged relation. Each member 11 is hingedly connected at 14 to a movable top clamping element or member 15. The top clamping member 15 is similar in shape to the bottom clamping member 11 and is provided with a corresponding central aperture 16 which is preferably somewhat larger in diameter than the aperture 12.

The top clamping members 15 are adapted to swing open laterally of the direction of travel of the conveyor 10 and suitable mechanism is provided for opening and closing the clamping members 15 relative to the clamping members 11 at predetermined points in the path of travel of the conveyor 10. The closing mechanism is operative to hold the members 15 in closed and clamping relation relative to the members 11 between predetermined points or stations along the path of travel of the upper run of the conveyor 10.

The conveyor 10 is adapted to receive in supporting relation a web of plastic material 17 which may be polyethylene film or material having similar drawing characteristics. The material 17 is adapted to be positioned over the bottom clamping members 11 at a station where the top clamping members 15 are in the open position (Fig. 4). Thereafter the top members 15 are successively closed or moved into clamping relation with the members 11 by the closing and holding mechanism referred to.

The conveyor 10, after receiving the web of material 17, passes through a heating chamber 18 which may include any conventional type of heating elements capable of raising the temperature of the web material to the desired degree, which is approximately 250° F. to 275° F. for a polyethylene film of approximately 30 mills thickness. The conveyor 10 then carries the heated material 17 to a position beneath the male forming members or dies 19 which are carried on a suitable endless conveyor indicated at 20.

Each male die member 19 is detachably mounted by a screw threaded connection or the like on a bracket 21 depending from the conveyor 20 so that forming dies of various shapes may be interchangeably used. The illustrated die member 19 is designed for use in forming a tubular container member having a reduced neck portion. The bracket 21 carries a cam roller 22 which is guided in its movement by a cam track indicated at 23. The die members 19, controlled by the cam 23, successively engage the heated material 17 through the apertures 12 and 16 of the clamping members 11 and 15 and draw the central portion of the heated material downwardly away from the clamping members.

An endless conveyor, indicated at 24, is provided which carries a series of female die members 25. The conveyor 24 is arranged so that a portion of the path of travel is horizontal and parallel to the upper run of the conveyor 10 but spaced a predetermined distance below the same. At the lower limit of movement of the forming dies 19 the film material is drawn or extended to provide the desired length of container and thickness of wall section. The movement of the conveyor 24 is coordinated with that of the conveyor 10 so that at the bottom limit of the movement of each male die 19 a female die 25 moves into contact with the end of the male die 19 to further draw the heated film material and shape or form the neck portion of the container.

After the lower portion of the container has been shaped or drawn, a cutting knife 26 preferably of the rotary type is moved into engagement with the male die 19 to cut the walls of the shaped container at a point which will provide the desired container length. The knife 26 may be supported for such movement in a conventional manner. The male and female dies 19 and 25 thereafter move apart and the finished container 27 may be stripped from the die 19 preferably by means of a blast of air delivered by conventional means through the passageway 28 provided in the die 19 and the supporting bracket 21.

In forming the top and neck portion of the container 27, thickened wall sections are provided at desired points, such as 29, 30 and 31, by providing the proper contour on the forming dies 19 and 25. The male die is provided with a flat end surface 32 which first engages the heated material. The material tends to cling to the surface 32 and cools sufficiently to prevent further extension or drawing, thus forming the thickened portion 29 at th end of the container. Continued movement of the die 19 causes the material to engage the die 19 at the peripheral edge or area 33 which forms the top shoulder of the container. The material is drawn somewhat between engagement with the end surface 32 and engagement with the shoulder area 33 of the die 19 so that the material 34 intermediate these areas is reduced in thickness, being somewhat less than the portion 29. The material tends to adhere to the die 19 at 33 and further movement of the die causes the material 35 between the area of contact 33 with the die 19 and the clamp member 11, 15 to become gradually reduced in thickness. The area of contact 33 forms the thickened shoulder portion 31 on the finished tube. The material does not flow but is drawn and becomes thinner as the drawing proceeds.

When the female die 25 is brought into engagement with the material, the internal shoulder or area 36 of the die 25 which is adapted to shape the bottom of the neck portion of the container 27 first engages the drawn material 34. The heated material tends to adhere to the die area 36 and is not drawn in that area while the portion of the material 34 intermediate the area 36 and the areas 32 and 33 on the male die 19 is drawn as the dies 25 and 19 are brought together. As a result of this operation the finished container 27 is provided with the thickened top portion 29, thickened shoulder portions 30 and 31, a thinner wall portion 37 connecting the top portion 29 and the shoulder 30, a relatively thin wall portion 38 connecting the shoulder portions 30 and 31, and a relatively thin body wall 35.

A container may be provided with thickened wall portions wherever desired by proper shaping of the male and female dies to provide points of resistance to the drawing of the material when it is formed in the manner described.

In Figs. 9 to 13 there is shown a nursing unit or bottle 40 which illustrates a type of container which may be readily formed by the method which has been described. In order to form the nursing bottle 40 the male die is shaped to provide the bottle 40 with a nipple portion 41 having a rounded and somewhat thickened top 42 which is adapted to be punctured at 43 by a sharp tool when the bottle 40 is put into use. The nipple portion 41 includes a shoulder or base portion 44 which is of somewhat thicker section than the walls 45 of the nipple portion 41, the latter being relatively thin and flexible. The shoulder 44 is relatively thick and rigid and is joined to an outer shoulder 46 by connecting wall portions 47.

The outer shoulder 46 is also of relatively thick section and is relatively rigid, forming the top edge of the container body 48, the connecting wall portion 47 being thin and flexible and the downwardly extending walls of the body 48 of the container being considerably thinner and flexible to permit their collapse as the fluid is withdrawn through the aperture 43 in the nipple portion 41.

In forming the nursing unit or bottle 40 the polyethylene film or similar material is heated as described and drawn over a male forming member to provide the wall sections as described. The material is drawn under sufficient heat to provide sterilization and when removed from the mandrel the open end may be sealed by heat and pressure. When it is desired to use the bottle, an end portion may be cut off, and the fluid may be inserted with the bottle supported in the inverted position in an appropriate holder or the like after which the end may be re-sealed in a conventional manner and the nipple 41 perforated at 43 to place the filled bottle in condition for use. The walls 45 of the nipple portion 41 are relatively flexible and somewhat rubber-like and permit the child to nurse from the bottle in the same manner as with a conventional rubber nipple.

In Figs. 12 and 13 a modified form of a nursing bottle is shown. In this form the bottle 50 is provided with a top or neck portion 51 over which there is provided a cover member 52 which is of dissimilar material and which is positioned loosely in the female die before the final drawing operation. The cover member 52 may be stripped from the top or neck portion 51 to provide an opening in the top thereof. The neck portion 51 and the adjoining top shoulder 53 of the bottle are relatively stiff and rigid, being formed with somewhat thickened sections. The depending walls 54 of the body of the bottle are thinner and more flexible as in the nursing bottle shown in Fig. 9. The bottle 50 may be filled and closed in the same manner as the bottle in Fig. 9 after which the top cover member 52 is stripped off and a nipple 55 of conventional form is secured on the neck portion 51 to put the bottle in condition for use.

In illustrating and describing the method of forming the containers and in the container structures shown as examples of the products obtained by the described method, a plastic material of single thickness only has been shown. Preferably a single thickness of polyethylene film is used to form containers by this method. Such containers are adapted for a variety of uses in the packaging field and in related fields.

The herein disclosed method may be employed to provide containers having multiple wall thickness by combining with the polyethylene a film of polyvinyl chloride, Pliofilm, Saran, or the like. In forming the containers from the multiple film material it is not necessary to laminate or adhere the films to each other, but they may be merely superimposed and drawn in the same manner as a single film. Such containers, when formed of polyethylene with a lining of one of the other plastic film materials referred to, have a still greater field of use.

While in the illustrated form of the apparatus a single line of die members is employed, all of which are adapted to form the same type container, it is possible to employ multiple lines of cooperating die members of the same or different shape for producing a plurality of containers of the same or different type.

I claim:

1. Apparatus for use in forming containers from plastic sheet material comprising a conveyor formation having a series of apertured elements thereon and cooperating clamping means for securing the edges of a sheet of the plastic material positioned over the apertures in each of said elements, a second conveyor formation having die members mounted thereon which are movable transversely of the path of movement of the first mentioned conveyor formation, said die members being aligned with the apertures in said elements, and a third conveyor formation having die members thereon which is movable in a path generally parallel with the path of movement of the first mentioned conveyor, said die members on said third conveyor being adapted for cooperation with the die members on said second conveyor formation whereby to shape the plastic sheet material into containers.

2. A mechanism for forming containers from sheet-like material which comprises in combination means for clamping the peripheral edges of the material and moving it through a predetermined path, means along said path for heating the material until it is sufficiently soft to permit drawing the same, means movable laterally of said path for progressively engaging the heated material on one face at radially spaced areas and for successively drawing the material between said areas, and means for thereafter engaging the material on the other face between said spaced areas and for further drawing the material between said areas while maintaining the thickness of the material at said areas, whereby to form a container having relatively thick wall sections connected by relatively thin wall sections.

3. A mechanism for forming containers from sheet-like plastic material which comprises in combination means for peripherally securing the material outwardly of a central area, means for heating the material until the central area is sufficiently soft to permit drawing operations, means for engaging the heated material at a predetermined point on one face thereof and drawing the heated material outwardly of said point to reduce its thickness, means for engaging the material at another predetermined point radially spaced from said first mentioned point of engagement and further drawing the heated material which is outwardly of said second mentioned point of engagement, and means for thereafter engaging the heated material on the opposite face between said first and second mentioned points of engagement to draw the material still further between said points of engagement while maintaining the thickness at said points of engagement, whereby to provide the container with walls of varying thickness.

References Cited in the file of this patent

UNITED STATES PATENTS

| Number | Name | Date |
|---|---|---|
| 1,232,764 | Brundage | July 10, 1917 |
| 1,344,760 | Goddard | June 29, 1920 |
| 1,719,736 | Turner | July 2, 1929 |
| 1,991,706 | Seabury | Feb. 19, 1935 |
| 2,018,075 | Leather | Oct. 22, 1935 |
| 2,049,529 | Todt et al. | Aug. 4, 1936 |
| 2,210,509 | Strauch | Aug. 6, 1940 |
| 2,229,613 | Strauch | Jan. 21, 1941 |
| 2,270,185 | Dulmage | Jan. 13, 1942 |
| 2,331,762 | Brown | Oct. 12, 1943 |
| 2,337,581 | Wiley | Dec. 28, 1943 |
| 2,357,806 | Borkland | Sept. 12, 1944 |
| 2,419,758 | Borkland | Apr. 29, 1947 |
| 2,425,581 | Vincent | Aug. 12, 1947 |
| 2,442,338 | Borkland | June 1, 1948 |
| 2,444,420 | Borkland | July 6, 1948 |
| 2,446,451 | Allen | Aug. 3, 1948 |
| 2,460,329 | Allen et al. | Feb. 1, 1949 |
| 2,532,844 | Hulbert, Sr., et al. | Dec. 5, 1950 |